(12) United States Patent  (10) Patent No.: US 7,847,815 B2
Patel et al. (45) Date of Patent: Dec. 7, 2010

(54) INTERACTION BASED ON FACIAL RECOGNITION OF CONFERENCE PARTICIPANTS

(75) Inventors: Labhesh Patel, San Francisco, CA (US); Sanjeev Kumar, San Francisco, CA (US); Mukul Jain, San Jose, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 11/546,264

(22) Filed: Oct. 11, 2006

(65) Prior Publication Data

US 2008/0088698 A1   Apr. 17, 2008

(51) Int. Cl.
*H04N 7/14* (2006.01)
(52) U.S. Cl. .................................. 348/14.08; 348/14.07
(58) Field of Classification Search ............ 379/202.01, 379/201.01, 201.02
See application file for complete search history.

(56) References Cited

U.S. PATENT DOCUMENTS

| 5,483,587 | A | 1/1996 | Hogan et al. |
| 5,600,366 | A | 2/1997 | Schulman |
| 5,673,253 | A | 9/1997 | Shaffer |
| 5,729,687 | A | 3/1998 | Rothrock et al. |
| 5,917,830 | A | 6/1999 | Chen et al. |
| 5,963,217 | A | 10/1999 | Grayson et al. |
| 6,044,081 | A | 3/2000 | Bell et al. |
| 6,137,834 | A | 10/2000 | Wine et al. |
| 6,141,324 | A | 10/2000 | Abbott et al. |
| 6,236,854 | B1 | 5/2001 | Bradshaw |
| 6,269,107 | B1 | 7/2001 | Jong |
| 6,332,153 | B1 | 12/2001 | Cohen |
| 6,501,739 | B1 | 12/2002 | Cohen |
| 6,505,169 | B1 | 1/2003 | Bhgavath et al. |
| 6,608,820 | B1 | 8/2003 | Bradshaw |
| 6,643,496 | B1 | 11/2003 | Shimoyama et al. |
| 6,650,652 | B1 | 11/2003 | Valencia |
| 6,671,262 | B1 | 12/2003 | Kung et al. |
| 6,675,216 | B1 | 1/2004 | Quatrano et al. |
| 6,718,553 | B2 | 4/2004 | Kenworthy |

(Continued)

OTHER PUBLICATIONS

Joerg Ott et al.; "Extended RTP Profile for RTCP-based feedback (RTP/AVPF)"; Jun. 29, 2002; RCF; pp. 1-43 http://www.ietf.org/proceedings/01dec/I-D/draft-ietf-avt-rtcp-feedback-01.txt.

(Continued)

*Primary Examiner*—Curtis Kuntz
*Assistant Examiner*—Karen L Le
(74) *Attorney, Agent, or Firm*—The Law Offices of Bradley J. Bereznak

(57) ABSTRACT

In one embodiment, a method includes capturing a facial image of a participant to a video conference session from a video stream of the video conference session. A database containing a plurality a stored facial images is then accessed in an attempt to match the facial image with one of the stored facial images. Each stored facial image is associated with information in the database associated with a person, the information being retrieved in the event of a match. It is emphasized that this abstract is provided to comply with the rules requiring an abstract that will allow a searcher or other reader to quickly ascertain the subject matter of the technical disclosure.

12 Claims, 5 Drawing Sheets

U.S. PATENT DOCUMENTS

| | | | |
|---|---|---|---|
| 6,735,572 | B2 | 5/2004 | Landesmann |
| 6,744,785 | B2 | 6/2004 | Robinett et al. |
| 6,771,644 | B1 | 8/2004 | Brassil et al. |
| 6,771,657 | B1 | 8/2004 | Elstermann |
| 6,775,247 | B1 | 8/2004 | Shaffer et al. |
| 6,816,469 | B1 | 11/2004 | Kung et al. |
| 6,865,540 | B1 | 3/2005 | Faber et al. |
| 6,876,734 | B1 | 4/2005 | Summers et al. |
| 6,925,068 | B1 | 8/2005 | Stanwood et al. |
| 6,931,001 | B2 | 8/2005 | Deng |
| 6,931,113 | B2 | 8/2005 | Ortel |
| 6,937,569 | B1 | 8/2005 | Sarkar et al. |
| 6,947,417 | B2 | 9/2005 | Laursen et al. |
| 6,956,828 | B2 | 10/2005 | Simard et al. |
| 6,959,075 | B2 | 10/2005 | Cutaia et al. |
| 6,976,055 | B1 | 12/2005 | Shaffer et al. |
| 6,989,856 | B2 | 1/2006 | Firestone et al. |
| 7,003,086 | B1 | 2/2006 | Shaffer et al. |
| 7,007,098 | B1 | 2/2006 | Smyth et al. |
| 7,084,898 | B1 | 8/2006 | Firestone et al. |
| 7,127,487 | B1 | 10/2006 | Wang et al. |
| 7,379,653 | B2 | 5/2008 | Yap et al. |
| 2001/0000540 | A1 | 4/2001 | Cooper et al. |
| 2002/0004841 | A1 | 1/2002 | Sawatari |
| 2002/0087976 | A1 | 7/2002 | Kaplan et al. |
| 2002/0163918 | A1 | 11/2002 | Cline |
| 2003/0025786 | A1* | 2/2003 | Norsworthy ............. 348/14.08 |
| 2003/0076850 | A1 | 4/2003 | Jason, Jr. |
| 2003/0198195 | A1 | 10/2003 | Li |
| 2004/0057449 | A1 | 3/2004 | Black |
| 2004/0165527 | A1 | 8/2004 | Gu et al. |
| 2004/0165710 | A1 | 8/2004 | DelHoyo et al. |
| 2004/0199659 | A1 | 10/2004 | Ishikawa et al. |
| 2004/0213152 | A1 | 10/2004 | Matuoka et al. |
| 2004/0250201 | A1* | 12/2004 | Caspi ......................... 715/512 |
| 2005/0069102 | A1 | 3/2005 | Chang |
| 2005/0078171 | A1 | 4/2005 | Firestone et al. |
| 2005/0081244 | A1 | 4/2005 | Barett et al. |
| 2005/0138372 | A1 | 6/2005 | Kajihara et al. |
| 2005/0259803 | A1 | 11/2005 | Khartabil |
| 2006/0020995 | A1 | 1/2006 | Opie et al. |
| 2006/0090166 | A1* | 4/2006 | Dhara et al. ................ 719/318 |
| 2006/0189337 | A1 | 8/2006 | Farrill et al. |
| 2006/0259755 | A1* | 11/2006 | Kenoyer ....................... 713/1 |
| 2007/0110029 | A1 | 5/2007 | Gilmore, II et al. |
| 2007/0123284 | A1 | 5/2007 | Schliwa-Bertling et al. |
| 2007/0133435 | A1 | 6/2007 | Eneroth et al. |
| 2007/0188597 | A1* | 8/2007 | Kenoyer .................. 348/14.08 |

OTHER PUBLICATIONS

T. Friedman et al.; "RTP Control Protocol Extended Reports (RTCP XR)"; Network Working Group; Nov. 2003; pp. 1-55 http://www.ietf.org/rfc/rfc3611.txt.

Handley et al. SIP: Session Initiation Protocol. RFC 2543. Mar. 1999. pp. 13 and 14. http://tools.ietf.org/html/rfc2543.

* cited by examiner

INTERACTION BASED ON FACIAL RECOGNITION OF CONFERENCE PARTICIPANTS

TECHNICAL FIELD

This disclosure relates generally to the fields of biometrics and video conferencing.

BACKGROUND

In many cases the individual participants to a video conference session do not know or recognize each other. Typically, this requires some sort of introduction period at the start of the video conference. Alternatively, interruptions for the purpose of identifying a participant may occur during the video conference session. A participant may want to interact with another participant, for example, to privately ask a question to someone who was just speaking in the meeting, or to start an instant messaging (IM) session with that person to privately discuss the issue before sharing it with everybody in the conference. In either scenario, interruptions or introductions for the purpose of sharing identity information are time consuming, inconvenient, and disruptive to normal meeting discussions.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

In the following description specific details are set forth, such as device types, system configurations, device types, communication methods, etc., in order to provide a thorough understanding of the present invention. However, persons having ordinary skill in the relevant arts will appreciate that these specific details may not be needed to practice the present invention.

In the context of the present application, a computer network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the endpoint devices or nodes may include servers and personal computers. The nodes typically communicate by exchanging discrete frames or packets of data according to predefined protocols.

In general, an endpoint represents an end user, client, or person who is capable of participating in an audio conference session via conferencing system. Endpoint devices that may be used to initiate or participate in a conference session include a personal digital assistant (PDA); a personal computer (PC), such as notebook, laptop, or desktop computer; an audio/video appliance; a streaming client; a television device with built-in camera and microphone; or any other device, component, element, or object capable of initiating or participating in exchanges with a video conferencing system.

Figure 6:
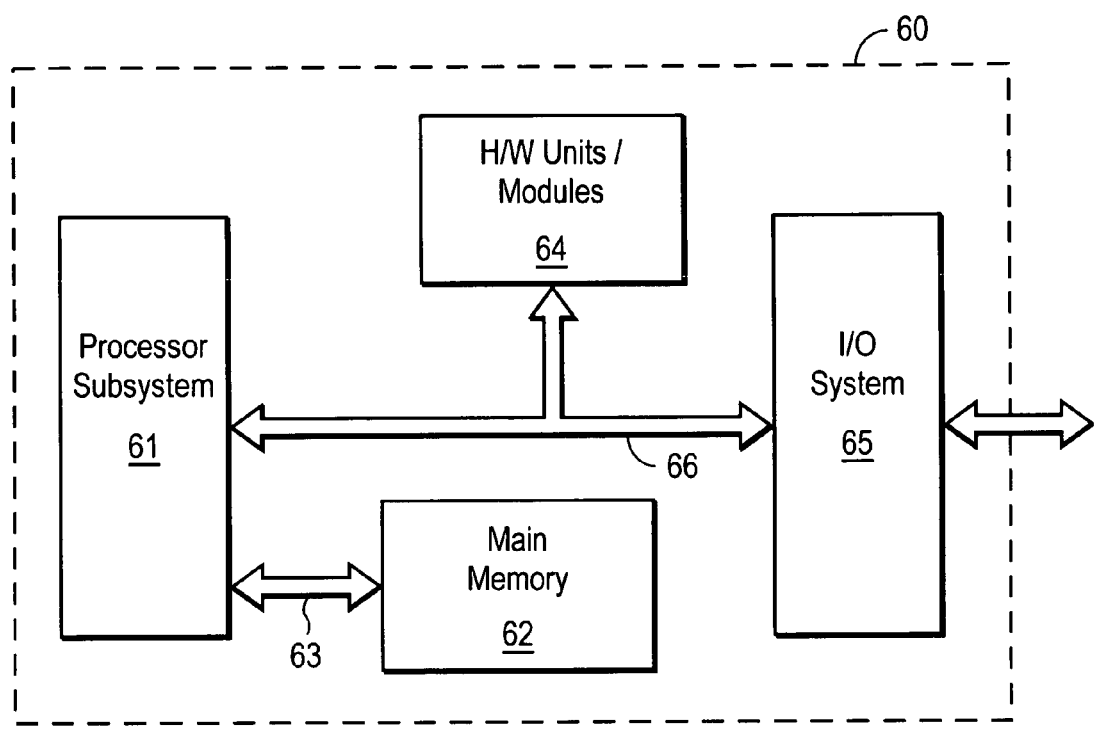
FIG. 6 illustrates basic components of an example node.

FIG. 6 illustrates basic components of an example node 60, which typically comprises a number of basic subsystems that includes a processor subsystem 61, a main memory 62 and an input/output (I/O) subsystem 65. Data is transferred between main memory ("system memory") 62 and processor subsystem 61 over a memory bus 63, and between the processor and I/O subsystems over a system bus 66. Examples of the system bus may include the conventional lightning data transport (or hyper transport) bus and the conventional peripheral component interconnect (PCI) bus. Node 60 may also comprise other hardware units/modules 64 coupled to system bus 66 for performing additional functions. Processor subsystem 11 may comprise one or more processors and a controller device that incorporates a set of functions including a system memory controller, support for one or more system buses and direct memory access (DMA) engines.

Figure 1:
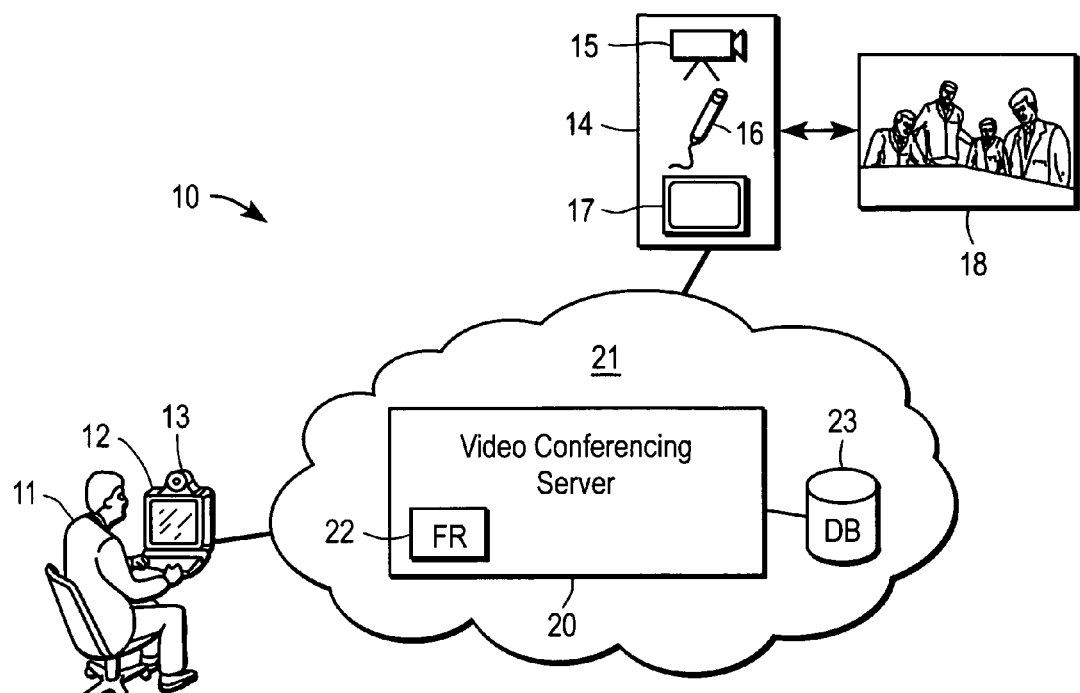
FIG. 1 illustrates an example video conferencing system.

FIG. 1 illustrates an example video conferencing system 10 that includes a video conferencing server 20 located on an Internet protocol (IP) network 21. Video conference server 20 includes software (or firmware) plug-ins, modules, or enhancements that implement the various features and functions described herein. In this example, video conferencing server 20 is shown coupled with a database 23 that is used to store information (e.g., name, ID number, department, phone number, email address, etc.) about employees and other individuals associated with the organization for which the conference session is being held. Database 23 also stores image data of the faces of persons within (and possibly outside on the organization.

In the embodiment shown, video conference server 20 includes a digital signal processor (DSP) or firmware/software-based system that mixes and/or switches audio/video signals received at its input ports under the control of server 20. The audio/video signals received at the conference server ports originate from each of the conference or meeting participants (e.g., individual conference participants using endpoint devices 12 & 14), and possibly from an interactive voice response (IVR) system (not shown). Conference server 20 may also incorporate or be associated with a natural language automatic speech recognition (ASR) module for interpreting and parsing speech of the participants, and standard speech-to-text (STT) and text-to-speech (TTS) converter modules.

It is appreciated that in different specific implementations the media path for the conference participants may include audio/video transmissions, e.g., Real-Time Transport Protocol (RTP) packets sent across a variety of different networks (e.g., Internet, intranet, PSTN, etc.), protocols (e.g., IP, Asynchronous Transfer Mode (ATM), Point-to-Point Protocol (PPP)), with connections that span across multiple services, systems, and devices.

System 10 also shows a user 11 participating in a videoconference via endpoint 12, which comprises a PC with a camera 13. In this example the main conference includes a group 18 connected with video conferencing server 20 via endpoint 14, which includes a camera 15, microphone 16 and display monitor 17. In accordance with one embodiment, video conferencing server 20 includes a facial recognition (FR) module 22 (e.g., software) that may be utilized to pick someone's face out of an image, extract that face from the rest of the scene, and compare it to a catalog of facial images stored in database 23. By way of example, FR module 22 may comprise a software program such as the FaceIt™ sold by Identix, Inc., of Minnetonka, Minn., or facial recognition programs sold by Viisage Technology of Littleton, Mass. These programs analyze images of human faces for the purpose of identifying them.

In the embodiment of FIG. 1, FR module 22 may take a captured ("snapshot") facial image of a conference participant and measure characteristics such as the distance between the eyes, the length of the nose, the outline of the face, and the angle of the jaw, and create a unique "template" of the facial image. This template may then be stored in database 23 as an object. Using templates, module 22 may compare a captured image with a stored image (e.g., a pre-existing photo from database 23) and produce a score that measures how similar the images are to each other. That is, module 22 works by comparing facial landmarks, i.e., specific proportions and angles of defined facial features.

In certain implementations, different snapshots may be taken of a conference participant as the person slightly moves (or by taking a much smaller number of snapshots from a stereo camera) and comparing it against a known database of facial eigenvectors. Database 23 may store facial eigenvectors (a series of facial pictures from different angles that can uniquely identify a person) along with the profile of each person. In one embodiment, the system matches each of the outlined participant faces in the video conference meeting against the stored catalogue or corporate directory in order to identify the participants. This matching may occur either at the start of a conference session as each person or group joins in, or whenever a participant selects a facial image of another participant via a user interface running on an endpoint device that connects with server 20.

In one embodiment, FR module 22 is utilized in communication with a graphical user interface running on a user's endpoint device (e.g., PC 12) that allows the user to position a mouse or other cursor control device on the image of a person's face during a video conference. The user may then "click" on that image (i.e., object) to obtain identity information about that participant. The user interface then communicates the facial image information to FR module 22, which then performs a lookup to database 23 in an attempt to match the selected person's face. In another embodiment, the interface may be used to initiate interactions with the selected participant in a video conference session—for example, by starting a communication session (e.g., IM, email, or telephony) with the selected participant via video conferencing server 20. It is appreciated that the video conference session may be either live or recorded in order to start a communication session (such as IM or email or telephony session) with a selected person.

Figure 2:
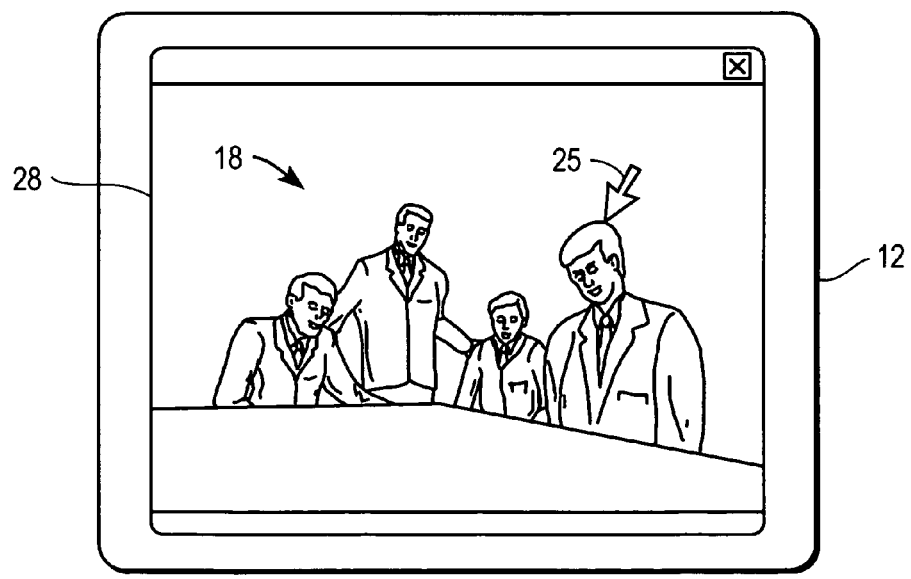
FIG. 2 illustrates an example display of conference participants on an endpoint device.

FIG. 2 illustrates an example display of the conference participants in group 18 on a display screen of endpoint device 12. Group 18 appears in a window 28 of the GUI running on PC 12. In one embodiment, the outline of each participant to the video conferencing is converted into an active object that a user of the GUI can select (e.g., "click" on) in order to obtain information about that person. By way of example, a cursor arrow 25 is shown positioned by a user over the face of the participant sitting on the far right-hand side of the conference table in group 18. The user, for instance, may utilize a cursor device or mouse to encircle or "lasso" a person's face in order to convert the facial image into an active object. In another embodiment, server 20 executes a routine or procedure wherein each new participant to a video conference has their facial image automatically captured and converted into a "clickable" object when they join the conference session. Once a participant's facial image has been captured, module 22 of server 20 may attempt to match that image within database 23 in response to a user selecting or clicking on that facial image (i.e., when cursor arrow 25 is positioned over the person's face).

Practitioners in the art will understand that the GUI may be generated by software (i.e., code) running the user's PC. In other cases, the GUI may comprise a collaborative web-based application that is accessed by the browser software running on the user's PC. In other instances, the GUI may comprise a downloaded application, or other forms of computer-executable code that may be loaded or accessed by a participant's PC. For instance, the software code for implementing the GUI may be executed on server 20 and accessed by users who want to utilize the features provided therein.

Figure 3:
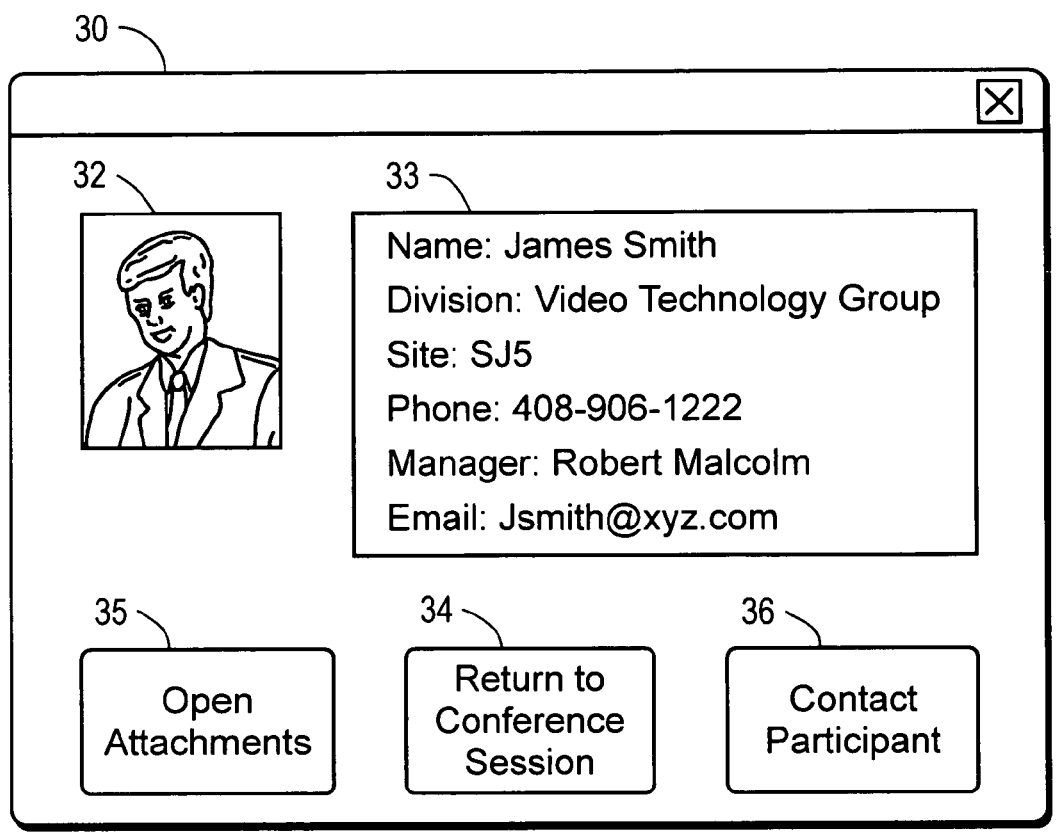
FIG. 3 illustrates an example graphical user interface (GUI).

FIG. 3 illustrates an example graphical user interface (GUI) window 30 produced on a user's PC or other endpoint device in response to the user clicking on a conference participant's facial image. In the embodiment shown, when a user clicks on a meeting participant in the video window the system displays a photo 32 (either copied from the video window or reproduced from file storage) of that person along with various information about that person. In this case, the information includes the participant's name, company division, site location, office phone number, manager's name, and email address. All of this information is associated with that person's image as stored in the corporate directory/database. The information is presented in a data field 33 of window 30.

The bottom of window 30 is shown including three example command buttons (icons) 34-36 that may be clicked on or otherwise selected by a user. Command button 34 returns the user to the video stream (e.g., window 28 of FIG. 2) of the ongoing (or recorded) conference session. Selection of command button 35 causes any attachments that participant 32 may have submitted for group viewing/discussion to be displayed to the user. For instance, each participant may have been invited to submit a report on a certain subject or topic before joining the meeting. Command button 35 allows a user to quickly view the relevant document(s) submitted by a particular participant. Lastly, selection of command button 36 causes the system to initiate communications between the user and participant 32. Communications may be through a predetermined media channel (e.g., IM) or selectable via a pull-down menu that presents the user with various communication options (e.g., IM, email, phone, etc.).

In another embodiment, the actual contact details such as IM, telephone number, or email address of one or more conference participants may be suppressed or hidden from view during certain types of conferences or meetings. For example, in a large conference call or public meeting individual participants may choose to keep their contact information private to all participants. Additionally, certain participants (e.g., a CEO participating in a public briefing) may choose to disable user interface-initiated communications entirely. Both of these features may be implemented by a user preference setting that hides or masks identification information of that user during a conference session.

In a slightly different embodiment, rather than revealing contact information via a user interface the conference server may instead automatically generate a temporary mapping or anonymous link to a communication device associated with that person, such as <participant1@conference.server>, e.g., based on their order of joining the conference. In this manner, the participant who is requesting communications with another conference attendee only sees the temporary mapping details—which may still be used to contact that attendee—but without actually revealing the personal contact details of that participant. In other words, communications may be initiated with a selected conference participant via a user interface without revealing personal contact information about that participant.

It is appreciated that different embodiments may execute different routines/approaches for establishing communications between the user and the selected meeting participant. For instance, in one embodiment, the user may be given an option to start a telephony session with a conference participant immediately after the user clicks on the outline of that participant in the video window. In another embodiment, the user can drag and drop the outline of a meeting participant from the video window onto a soft phone running on his PC in order to start a telephony session with that person.

In another embodiment, the user may start an IM session with a meeting participant by clicking on the outline of that participant in the video conference window. In still another embodiment, the user can start an IM session with a meeting participant by dragging and dropping the outline of that participant from the video conference window on to the IM client running on his PC. Alternatively, the user can add a video conference participant on to an ongoing IM conference chat conference by dragging the outline of that person from the video conference window on to the IM conference window.

In yet another embodiment, the system opens a new email message composition for a video conference participant and automatically fills in the selected participant's email address when the user clicks on the outline of that participant in the video conference window, or drags the outline of that participant's facial image from the video conference window onto an email client such as Microsoft Outlook™.

In another embodiment, the conferencing system may schedule a new meeting between the user and a selected video conference participant when the user drags the outlined image of the participant's face onto a scheduling application such as MeetingMaker™ running on the user's PC desktop. In a slight variation of this embodiment, the system may generate and send an invitation to a conference session participant to join another existing meeting when a user clicks on the facial image of that participant, or drags the participant's outline from the video conference window onto a scheduled meeting in his meeting scheduling application.

In still another embodiment, the GUI may be configured to allow a user to drag a file (such as document containing meeting notes) onto the facial image of a participant in the video conference window in order to send (e.g., email) that file to that participant.

Figure 4:
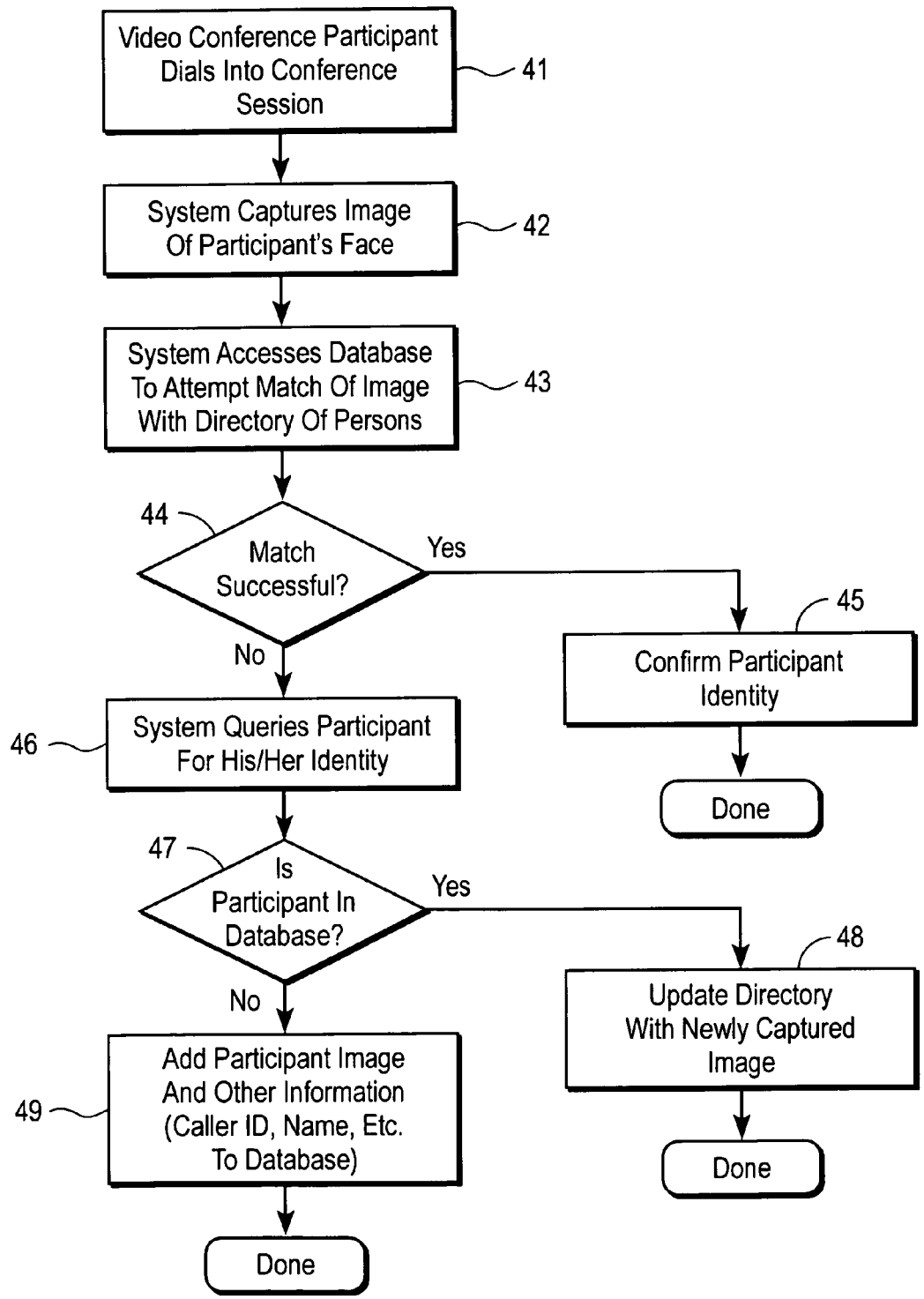
FIG. 4 illustrates an example method of operation for a video conferencing system.

FIG. 4 illustrates an example method of operation for a video conferencing system. The process begins when a video conference participant dials into a conference session from an endpoint device (step 41). Immediately upon joining the session, the system automatically captures an image of the participant's face (step 42), and then accesses a directory database in an attempt to match the person's face with a stored image (step 43). Once the system matches or recognizes a person's facial image in a meeting, the identity information of that person is attached to an object associated with that image, obviating the need for a database query when a user later clicks on or otherwise selects that person's image. In the event that a match is made, the participant's identity may optionally be confirmed (step 45). The confirmation process may simply involve an IVR query sent to the participant (e.g., "Are you James Smith of the Video Technology Group?).

In the event that a match to the captured facial image is not found, the system may send a query to the participant requesting that he identify himself (block 46). Certain conferencing system may be configured with authentication/identification procedures to insure that only authorized persons are admitted to a particular conference session. In such cases, the system may utilize a participant's name, badge number, or other unique identifier (e.g., fingerprint) to locate further information about that person from the corporate directory database. Instead of trying to match the facial image of that participant with a stored or archived facial image, the system may create a clickable object from the captured facial image, essentially transforming the facial image into a user selectable object for purposes of user interface-based association during the conference session. Additionally, the system may update the database by adding the recently captured image to the database entry associated with the participant.

Continuing with the example of FIG. 4, in the event that a participant identifies himself and the system determines that that person is not already in the corporate database (block 47), a new database entry in the directory may be added to include that participant's image and any available identification or contact information (block 49). For example, guests, vendors, or contractors may be invited to participate in a conference session. In order to facilitate interaction, each such participant may be requested/queried to provide certain basic information to be stored along with their image. In cases where a person such as a contractor has previously provided information about himself to the organization (e.g., name, street address, company affiliation, email address, phone number, etc.), yet who has never attended a video conference of that organization, his captured facial image may be added to his other information entered in the corporate database. Similarly, in the case where a participant's captured image does not match the facial image stored in the database entry for that person, the directory database may be updated by replacing the older image with the newly captured facial image (block 48).

It is appreciated that the example of FIG. 4 is also applicable to groups who dial into a conference session from a single endpoint device. Rather than capture the facial image of a single participant and compare it to a directory of stored images, the system would perform the same operations on each participant in that group. In other words, each of the steps outlined in FIG. 4 would be automatically applied to each individual of the group attending the meeting.

In another embodiment, the video conferencing system queries the database in response to a user of the GUI clicking on the image of a participant to a conference session. That is, the system does not attempt to match the facial image of a conference participant captured in the video feed against images stored in the corporate database until a particular participant has been selected by a user. In certain implementations this may involve the user having to draw a boundary around or using a lasso tool to frame a participant's face to cause the system to create an object for that face and then initiate a query to the database in an attempt to match the facial image with a known person. To put it differently, whereas the previously described embodiment operates proactively to identify everyone in the video conference session at the start, this latter embodiment operates reactively to a user selection/request for information identifying and associated with a particular participant.

Figure 5:
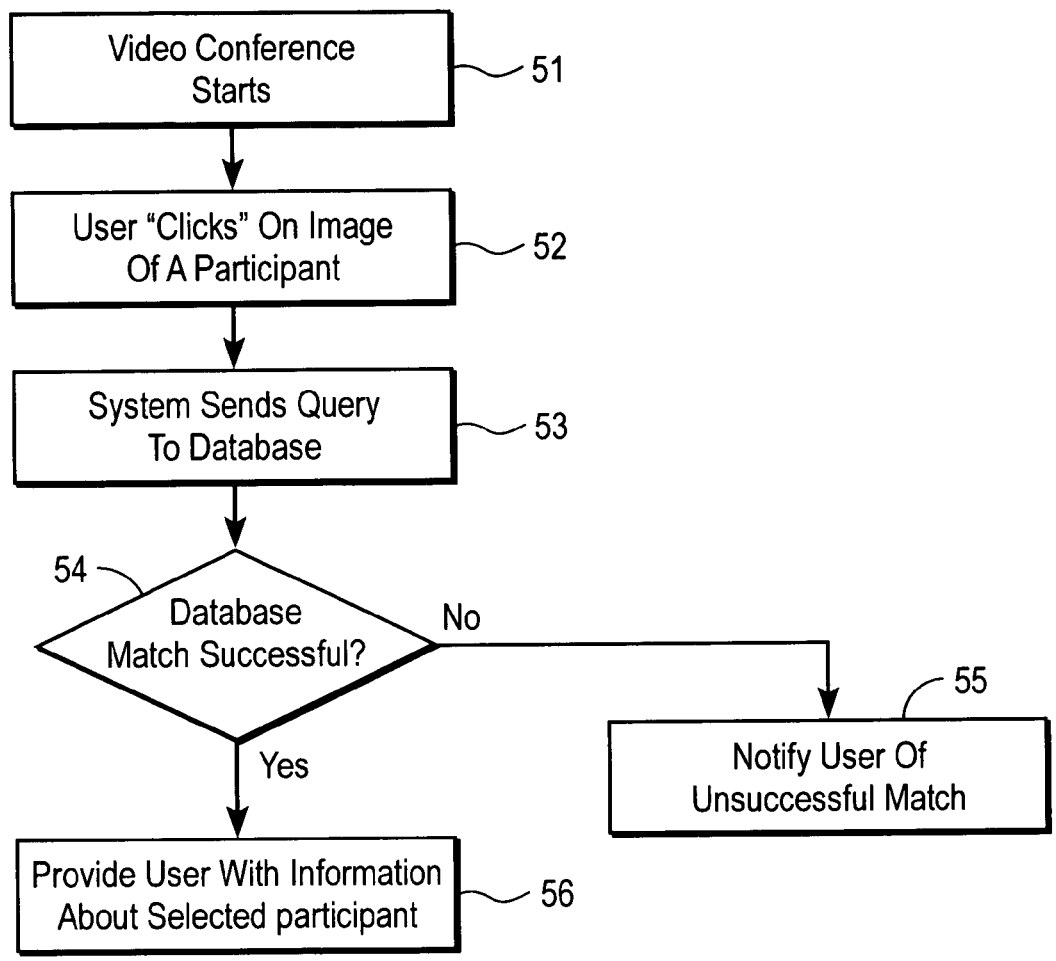
FIG. 5 illustrates an example method for obtaining identity information about a selected conference participant.

FIG. 5 illustrates an example method for obtaining identity information about a selected conference participant in accordance with the latter described embodiment. After the video conference starts (block 51) the conferencing system makes no attempt to identify participants to the meeting until a user outlines a particular participant's face, for example, by using a GUI to click on the person's face, lasso their face, draw a boundary around their face, or using other similar techniques/methods (block 52). At that point, the system sends a query to the database that attempts to match the facial image captured in the video feed with an image stored in the directory database. If the match is successful (block 56), the user is provided with detailed information about the selected participant (block 56). This information may be presented in a variety of ways; for example, as shown in FIG. 3. On the other hand, if the database query is unsuccessful, i.e., no match is found, the user may be notified of the failed result (block 55).

Instead of presenting a user with detailed information about a selected participant, the system may alternatively present the user with a list of different communication modes available for interacting with the participant. For example, the GUI may open a window that presents the user with the option of interacting via IM, email, telephone connection, etc. Using a mouse or other input device, the user may then click on one of the available communication modes. In response, the system establishes communication with the conference participant via the selected mode. For instance, if the user selects IM from the list presented, the system automatically establishes an IM session between the conference participant and the user via an appropriate communication channel, link, or connection.

It should be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Additionally, although the present invention has been described in conjunction with specific embodiments, numerous modifications and alterations are well within the scope of the present invention. Accordingly, the specification and drawings are to be regarded in an illustrative rather than a restrictive sense.

We claim:

1. A method comprising:
   capturing, in response to input received from a graphical user interface (GUI), a facial image of a participant to a video conference session from a video stream of the video conference session, the input being generated responsive to selection of the facial image by another participant, the GUI running on an endpoint device associated with the another participant;
   accessing a database containing a plurality a stored facial images, each stored facial image being associated with information associated with a person;
   matching the facial image with one of the stored facial images;
   retrieving the information associated with the one of the stored facial images; and
   establishing a private interactive communication session between the endpoint device running the GUI and the person associated with the one of the stored facial images, the private interactive communication session being separate from the video conference session.

2. The method of claim 1 further comprising creating, as a user interface selectable object, the facial image of the participant to the video conference session.

3. The method of claim 1 further comprising updating the database to include the captured facial image.

4. A method comprising:
   receiving input Identifying a facial image of a participant from a video feed to a video conference session;
   creating a user selectable object of the facial image;
   in response to input selection of the user selectable object during the video feed, initiating a database query in an attempt to match the facial image with one of a plurality of stored facial images, each stored facial image being associated with information associated with a person, the input selection being generated by a graphical user interface (GUI) running on an endpoint device; and
   in the event of a match between a particular stored facial image and the facial image, retrieving the information associated with the particular stored facial image; and
   establishing a private interactive communication session between the endpoint device and the person associated with the one of the stored facial images, the private interactive communication session being separate from the video conference session.

5. The method of claim 4 wherein the person associated with the particular stored facial image is one of a group of persons attending the video conference session from a single endpoint device.

6. The method of claim 4 further comprising capturing the facial image of the participant to the video conference session.

7. The method of claim 4 wherein the private interactive communication session comprises an instant message sent from the endpoint device running the GUI to an endpoint device of the person associated with the one of the stored facial images.

8. The method of claim 4 wherein the information includes a temporary mapping to a communications device of the person.

9. An apparatus comprising:
   a display; and
   a program that runs on a personal computer (PC) to produce a graphical user interface (GUI) on the display, the GUI providing a user of the PC with an ability to select a facial image of a participant from a video feed of a video conference session, selection of the facial image by the user during the video feed causing the PC to send output to a server hosting the video conference session, in response to receiving the output, the server accessing a database in an attempt to match the facial image with one of a plurality of stored facial images, each stored facial image being associated with information about a person, in the event of a match between a particular stored facial image and the facial image the server sending the information of the person associated with the particular stored facial image to the PC, the program being operable to display the information on the display, the GUI further providing the user with the ability to request the server to establish a private interactive communication session between the user and the person associated with the particular stored facial image in response to a click of a button on an input cursor device, the click occurring when a cursor positionable by the input cursor device is positioned over the facial image, the private interactive communication session being separate from the video conference session.

10. The apparatus of claim 9 wherein the private interactive communication session comprises an instant message session.

11. The apparatus of claim 9 wherein the private interactive communication session comprises an email message.

12. The apparatus of claim 9 wherein the private interactive communication session comprises a telephone call.

* * * * *